United States Patent [19]

Knowles

[11] 4,440,471
[45] Apr. 3, 1984

[54] FIBER OPTIC CONNECTORS

[75] Inventor: Robert G. Knowles, Litchfield, Conn.

[73] Assignee: Litton Systems, Inc., Watertown, Conn.

[21] Appl. No.: 319,438

[22] Filed: Nov. 9, 1981

[51] Int. Cl.³ ............................................. G02B 7/26
[52] U.S. Cl. ................................................ 350/96.20
[58] Field of Search ............... 350/96.20, 96.21, 96.22, 350/320

[56] References Cited
U.S. PATENT DOCUMENTS

| | | | |
|---|---|---|---|
| 4,215,913 | 8/1980 | Turley et al. | 350/96.21 |
| 4,261,642 | 4/1981 | Lewis et al. | 350/96.20 |
| 4,355,862 | 10/1982 | Kock | 350/96.20 |

Primary Examiner—John D. Lee
Attorney, Agent, or Firm—Brian L. Ribando

[57] ABSTRACT

A fiber optic connector includes a ferrule which receives the end of a fiber optic cable. The optic fiber of the cable is located in an axial bore in the terminal face of the ferrule, and an annular central portion defined by a groove which surrounds the axial bore is radially inwardly pinched to position the optic fiber in the center of the terminal face.

8 Claims, 4 Drawing Figures

U.S. Patent     Apr. 3, 1984     4,440,471
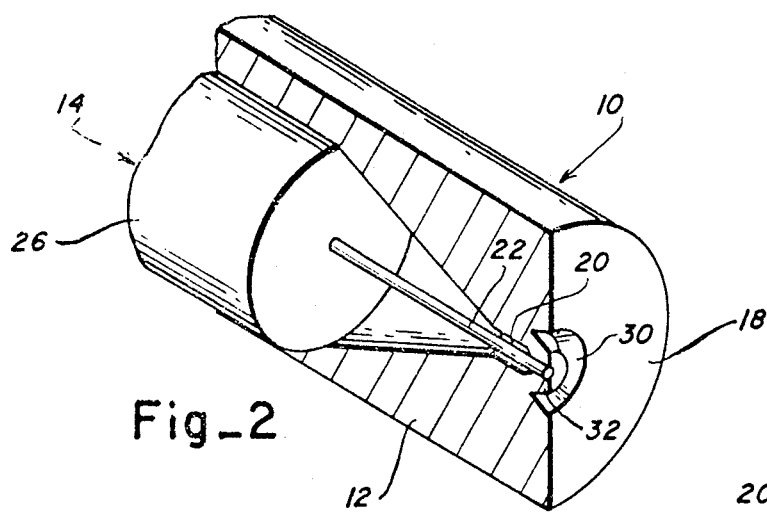
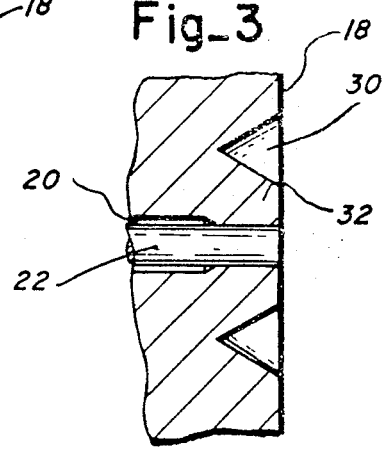
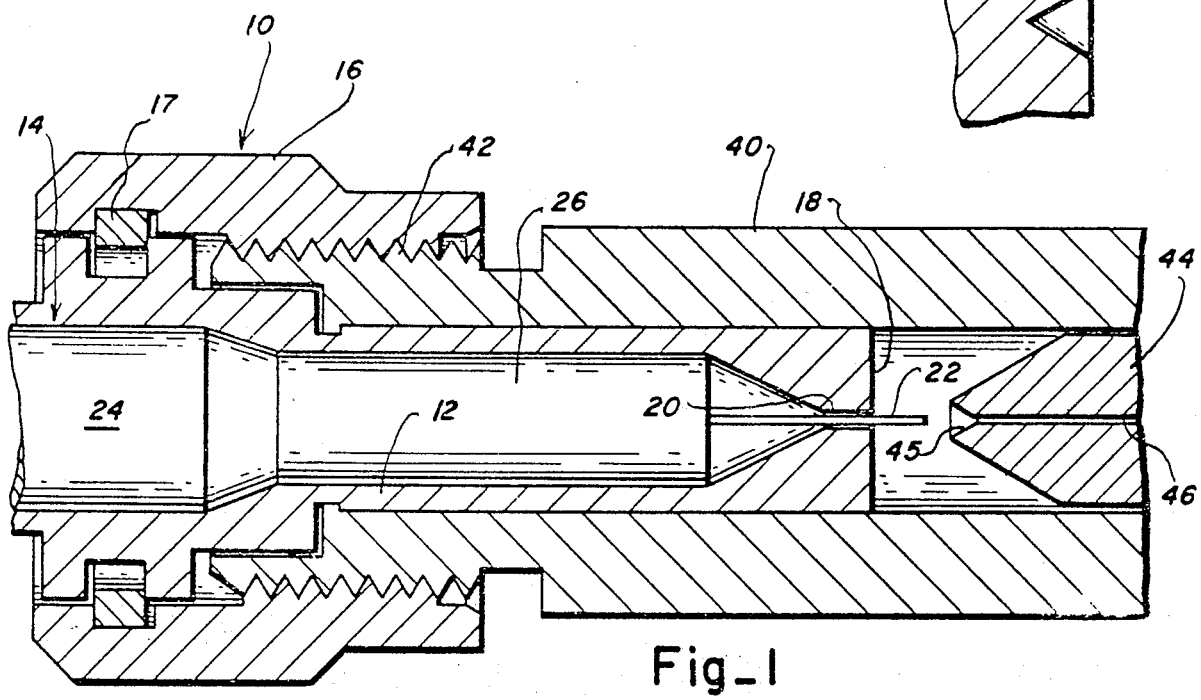
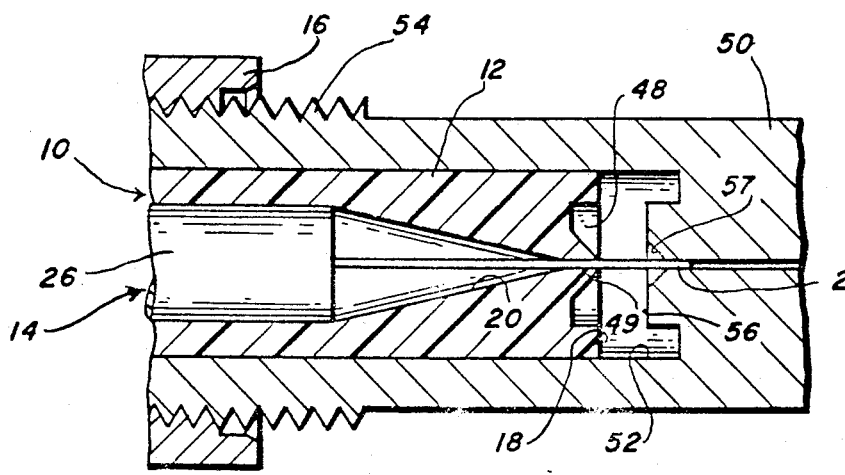

FIBER OPTIC CONNECTORS

This invention relates to fiber optic connectors.

Fiber optic connectors which optically couple two fiber optic cables, each having a single optic fiber, are well known in the art. Conventionally, each cable is mounted within a ferrule having its optic fiber projecting through a closely sized axial bore to form an optic terminal. The terminals are secured in axial alignment within a tubular connector body to thereby optically couple the optic fibers of the two cables. One of the critical factors effecting the performance of such connectors is the precision of the axial alignment of the fiber ends which is directly related to the size and centrality of the fiber locating hole in the end of each ferrule. These holes are generally dimensioned slightly larger than the dimension of the optic fiber to facilitate the insertion of the fiber therein. However, an oversized axial bore permits the optic fiber to deviate from the exact center of the ferrule.

It is an object of the present invention to provide a fiber optic connector having an improved optic terminal.

Other objects and advantages of the present invention will become apparent from the following portion of the specification and from the accompanying drawings which illustrate, in accordance with the mandate of the patent statutes, a presently preferred embodiment incorporating the principles of the invention.

Referring to the drawings:

FIG. 1 is a side view, in section, of an optic terminal of a fiber optic connector during fabrication in accordance with the teachings of the present invention;

FIG. 2 is a partial perspective view of the optic terminal of FIG. 1;

FIG. 3 is a sectional view of the tip of the optic terminal of FIG. 2; and

FIG. 4 is an alternate embodiment of an optic terminal of a fiber optic connector as it is formed.

As can be seen in FIG. 1, the fiber optic connector generally comprises at least one optic terminal 10 including a selectively configured hollow, cylindrical ferrule 12 in which a fiber optic cable 14 is mounted. A lock nut 16, mounted to the ferrule via a snap ring 17, is provided to secure the optic terminal 10 to a connector housing (not shown). The ferrule 12 has a terminal face 18 at one end having an axial bore 20 therethrough communicating with the ferrule's interior. This axial bore 20 is dimensioned slightly larger than the optic fiber 22 of the fiber optic cable 14. The protective jacket 24 and cladding layers 26 are removed from the end portion of the cable 14 to permit the unclad end of the fiber 22 to extend through the axial bore 20 to the terminal face 18.

As can be seen in FIGS. 2 and 3, the terminal face 18 of the finished terminal 10 includes a circular, V-shaped groove 30 which defines an annular central portion 32 of the ferrule concentric with the ferrule's axis. The annular central portion 32 slopes toward the center of the terminal face into engagement with the optic fiber 22 so as to define a constrictd portion of the axial bore 20. The optic fiber 22 is accordingly precisely located in the center of the terminal face 18.

A tubular staking fixture 40, shown in FIG. 1, having an externally threaded end 42 is employed to form the V-shaped groove 30 in the terminal face 18 during fabrication. The lock nut 16 secures the terminal 10 within the fixture 40 having the optic cable 14 inserted into the ferrule 12 with its optic fiber 22 projecting outwardly from the axial bore 20. A staking tool 44 having a precisely located circular lip 45 and a fiber accommodating bore 46 is guided by the tubular fixture 40 and forcefully impacts the terminal face 18 thereby pinching the ferrule material about the fiber and forming the "V" groove 30. The exact location of the circular lip 45 of the staking tool 44 with respect to the centerline of the staking fixture 40 ensures that the axis of the "V" groove 30 is on the centerline of the ferrule 12. Thus, the precise location of the fiber 22 is effected by the pinching of the ferrule about its centerline.

Prior to the staking operation, an expoxy is applied to the fiber optic cable 14 which will harden to maintain the cable secured within the ferrule 12 after the completion of the staking operation. Formation of the terminal 10 is completed by cleaving and polishing the end of the optic fiber 22.

In an alternate embodiment shown in FIG. 4, the ferrule 12 has a circular groove 48 molded into its terminal face 18 which defines annular central portion 49. In this embodiment, the axial bore 20 is constricted about the optic fiber 22 by a compression tool 50 having a selectively configured chamber 52. The ferrule 12 is forced into the chamber 52 by screwing the locknut 16 onto the threaded end 54 of the tool 50. The bottom wall 56 of the chamber 52 is configured with a recess portion 57 to compress the annular central portion 49 into engagement with the fiber 22 thereby centering it on the terminal face 18. Compressing the annular central portion is a gentler method of constricting the axial bore 20 than the staking operation discussed above. Accordingly, this embodiment is particularly applicable for optic cables having a glass optic fiber, since the possibility of fracturing the glass fiber when the axial bore is constricted is reduced.

What is claimed is:

1. A fiber optic connector having at least one optic terminal comprising
    a hollow cylindrical ferrule having a terminal face on one end,
    an axial bore through said terminal face communicating with the interior of said ferrule, said axial bore being dimensioned slightly larger than an optic fiber of a selected fiber optic cable,
    one end of said selected fiber optic cable disposed within said ferrule having its optic fiber located within said axial bore,
    a circular groove in said ferrule face defining an annular central portion concentric with said ferrule axis, and
    said annular central portion sloping towards the center of said terminal face into engagement with said optic fiber so as to define a constricted portion of said axial bore at said terminal face.

2. A fiber optic connector according to claim 1 wherein said circular groove is formed in said ferrule by impacting said terminal face with a staking tool.

3. A fiber optic connector according to claim 1 wherein
    said groove defining said annular central portion is molded into said ferrule, and
    said constricted portion of said axial bore is formed by radially inwardly compressing said annular central portion.

4. A fiber optic connector having at least one optic terminal comprising a hollow cylindrical ferrule having a terminal face, an axial bore through said terminal face communicating with the interior of said ferrule, said axial bore being dimensioned slightly larger than the optic fiber of a fiber optic cable, and a circular groove in said ferrule face defining an annular central portion concentric with the ferrule axis, whereby a radially inward force may be applied to said annular central portion to constrict said annular central portion about the optic fiber.

5. A fiber optic terminal for use with a fiber optic cable in a fiber optic connector, the fiber optic terminal comprising:

a hollow cylindrical ferrule having a terminal face on one end, an axial bore through said terminal face communicating with the interior of said ferrule, said axial bore being dimensioned slightly larger than the optic fiber of said fiber optic cable, one end of said fiber optic cable positioned within said hollow ferrule and having its optic fiber positioned within said axial bore, and a raised annular central portion of said terminal face surrounding said axial bore, said raised annular central portion having a conical shape defining a sloping wall, whereby a force may be applied to said sloping wall to radially constrict said axial bore around said optic fiber.

6. The fiber optic terminal of claim 5, wherein said raised annular central portion is molded onto said terminal face.

7. The fiber optic terminal of claim 5, wherein said raised annular central portion is formed in said terminal face with a staking tool.

8. A fiber optic terminal for use with a fiber optic cable, the fiber optic terminal comprising:

a hollow cylindrical ferrule having a terminal face on one end, an axial bore through said terminal face communicating with the interior of said ferrule, said axial bore being dimensioned slightly larger than the optic fiber of said fiber optic cable, and a raised annular central portion of said terminal face surrounding said axial bore, said raised annular central portion having a conical shape defining a sloping wall, whereby a force may be applied to said sloping wall to radially constrict said axial bore to the size of said optic fiber.

* * * * *